United States Patent [19]

Sinha

[11] 4,264,569

[45] Apr. 28, 1981

[54] PRODUCTION OF ANHYDROUS ALUMINIUM CHLORIDE

[75] Inventor: Hari N. Sinha, Surrey Hills, Australia

[73] Assignee: Commonwealth Scientific & Industrial Research Organization, Campbell, Australia

[21] Appl. No.: 79,008

[22] Filed: Sep. 26, 1979

[30] Foreign Application Priority Data

Sep. 26, 1978 [AU] Australia .............................. PD6121

[51] Int. Cl.³ .............................................. C01F 7/58
[52] U.S. Cl. ..................................... 423/495; 423/496
[58] Field of Search ................ 423/136, 495, 496, 135

[56] References Cited

U.S. PATENT DOCUMENTS

| 1,144,304 | 6/1915 | McAfee | 423/135 |
| 1,304,567 | 5/1919 | Hulin | 423/495 |
| 1,331,257 | 2/1920 | Heap | 423/495 |
| 3,842,136 | 10/1974 | Russell | 423/136 |

FOREIGN PATENT DOCUMENTS

| 2201866 | 7/1973 | Fed. Rep. of Germany | 423/495 |
| 130656 | 4/1978 | German Democratic Rep. | 423/495 |

Primary Examiner—Brian E. Hearn
Attorney, Agent, or Firm—Sughrue, Rothwell, Mion, Zinn and Macpeak

[57] ABSTRACT

A process for obtaining anhydrous aluminium chloride from aluminium chloride hexahydrate comprises heating the hexahydrate at a temperature in the range 200°–450° C. until it is substantially dehydrated and reacting the dehydrated material at a temperature in the range 350°–600° C. with a gas mixture containing chlorine, carbon monoxide, carbon dioxide and hydrogen, to produce gaseous anhydrous aluminium chloride.

5 Claims, 1 Drawing Figure

CHLORINE UTILIZATION Vs TEMPERATURE

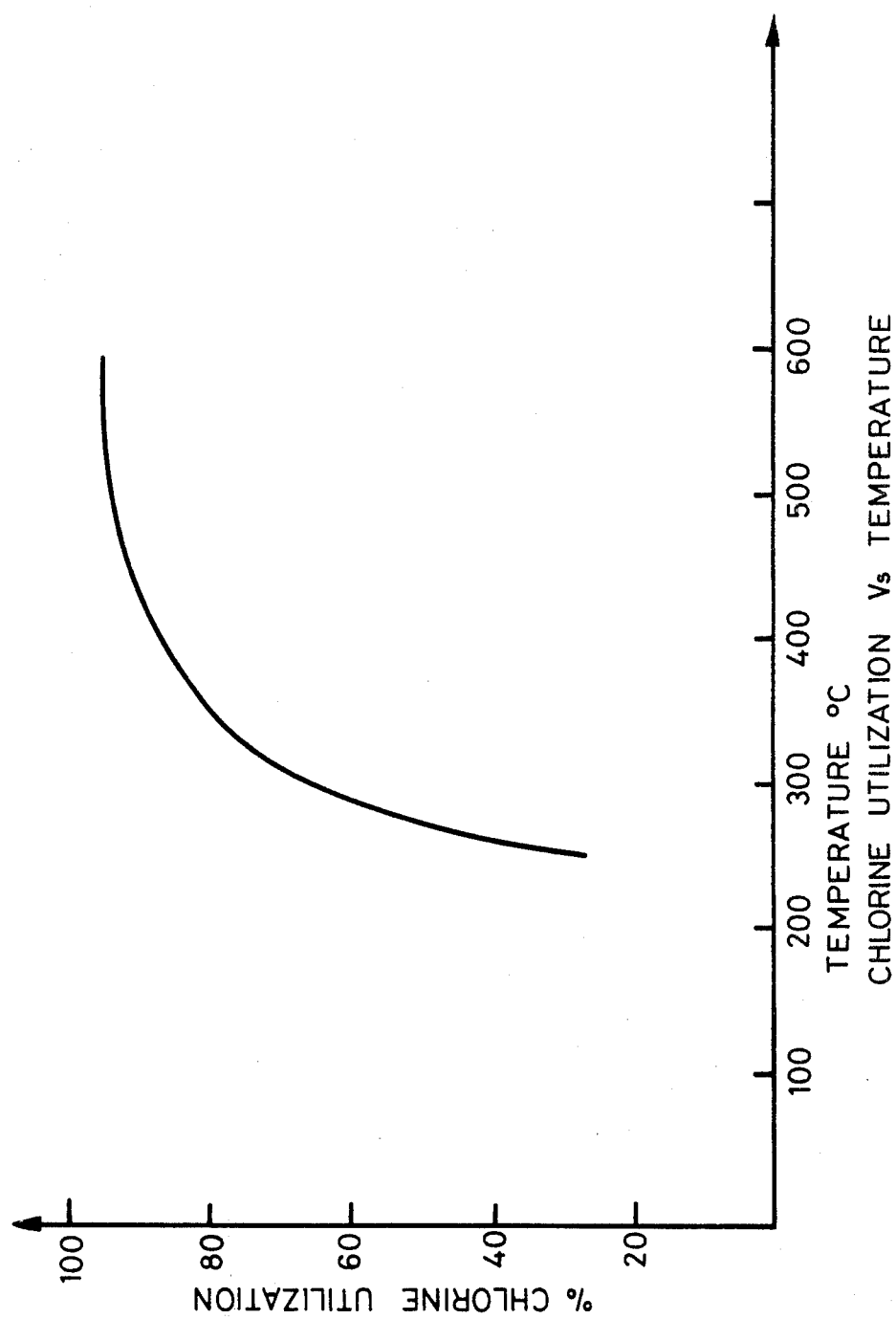

PRODUCTION OF ANHYDROUS ALUMINIUM CHLORIDE

BACKGROUND OF THE INVENTION

1. Field of the Invention

This invention relates to the production of anhydrous aluminium chloride and more particularly to an improved process for the production of this material from aluminium chloride hexahydrate by dehydration followed by chlorination.

2. Description of the Prior Art

Currently aluminium is produced from bauxite using a combination of the Bayer and Hall-Heroult processes. The Bayer process produces high purity alumina from bauxite which, in the Hall-Heroult process, is continuously dissolved in a fluoride bath (principally cryolite) and reduced electrolytically, and molten aluminium is collected above the carbon cathode which forms the base of the furnace. The electrolytic reduction of alumina which is the basis for the Hall-Heroult process uses very large amounts of electrical energy, typically 13-18 MWh per tonne of metal and also consumes carbon anodes through oxidation by oxygen evolved during the electrolysis.

In recent years, production of aluminium by the electrolysis of anhydrous aluminium chloride dissolved in a molten electrolyte composed of one or more halides of alkali and/or alkaline earth metals has received considerable attention (U.S. Pat. No. 3,725,222) as this method offers certain potential advantages over the Hall-Heroult process. The advantages which include operation at a lower temperature, lower power consumption (9.5 MWh per tonne of metal) and non-consumption of carbon electrodes indicate significant cost savings over the conventional Hall-Heroult process.

A pre-requisite to the chloride electrolysis process is the production of high purity anhydrous aluminium chloride feed for the electrolysis stage. Although the potential of aluminium chloride electrolysis as a method of producing aluminium metal has been recognized for a while, the development of the process to a commercial scale has been inhibited due to the unavailability of an economic process for the production of high purity anhydrous aluminium chloride. Many processes have been proposed for the production of anhydrous aluminium chloride from bauxite and alumina but to date the suggested methods have not satisfied the objective of commercial production of high purity anhydrous aluminium chloride. Chlorination of bauxite results in aluminium chloride contaminated with the chlorides of iron, titanium and silicon and the separation of these impurities from aluminium chloride requires complex and costly processing steps. On the other hand, the chlorination of Bayer, alumina, although it results in high purity aluminium chloride, requires an expensive starting material and unlike direct electrolysis of alumina in the Hall cell introduces an extra step of chlorination. Furthermore, Bayler alumina contains about 0.5% of sodium oxide, which during chlorination, will consume chlorine to produce $NaAlCl_4$. The formation of the latter compound would not only create problems during chlorination but also result in some loss of chlorine values. Chlorination is generally carried out above 600° C. (West German Pat. No. 1,229,056) using high purity, as such expensive, carbon monoxide as reductant. An alternative to carbon monoxide as reductant is the chlorination of porous alumina particles being intermixed, and preferably coated or impregnated, with carbon to provide an average carbon content of about 15-24% by weight and having an average hydrogen content of less than 0.5% by weight and desirably of less than 0.3% and preferably less than 0.1% (U.S. Pat. No. 3,842,163). The preferred chlorination temperatures are in the range 650°-700° C.

Unlike many hydrated compounds, aluminium chloride hexahydrate when heated to remove combined water does not yield anhydrous aluminium chloride. Instead, $Al_2O_3$, HCl and $H_2O$ are produced according to the following reaction:

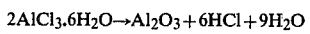

$$2AlCl_3.6H_2O \rightarrow Al_2O_3 + 6HCl + 9H_2O$$

According to the studies which have been carried out on the dehydration reaction, decomposition takes place at 180° C. and heating in a stream of HCl does not prevent the above hydrolysis reaction. Very little loss in weight is observed below this temperature, particularly at 100° C.

The literature contains very little information on the dehydration of $AlCl_3.6H_2O$ to $AlCl_3$. According to Heap and Newbery (British Pat. Nos. 130,626 and 131,039) dehydration of aluminium chloride hexahydrate can be carried out by reacting it with phosgene which has a great affinity for water. These patents do not give any experimental details and results except indicating that aluminium chloride hexahydrate was heated at 100° C. before reacting it with phosgene and that hydrogen was excluded from the chlorinating gas mixture in order to avoid formation of water.

Thus it may be seen that the dehydration of hexahydrate according to the teaching of the above patents would result in the production of a large excess of HCl. The amount of HCl produced would be about four times that required to produce aluminium chloride hexahydrate from bauxite or other aluminum containing materials as shown below, representing an overall loss of chlorine and CO from the system.

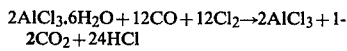

$$2AlCl_3.6H_2O + 12CO + 12Cl_2 \rightarrow 2AlCl_3 + 12CO_2 + 24HCl$$

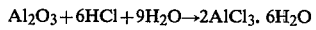

$$Al_2O_3 + 6HCl + 9H_2O \rightarrow 2AlCl_3.6H_2O$$

Although one of the patents (British Pat. No. 131,039) discloses the use of producer gas (practically free from hydrogen), production of hydrogen-free producer gas is relatively expensive and the presence of nitrogen in the producer gas, although it may not affect the dehydration reaction, would have an adverse effect on the condensation of $AlCl_3$ from gas mixture containing $AlCl_3$, CO, $CO_2$ and $N_2$ due to the dilution effect of nitrogen further lowering the partial pressure of $AlCl_3$.

East German Pat. No. 130,656 describes a two-stage process for the production of anhydrous aluminium chloride wherein, in the first stage aluminium chloride hexahydrate is heated at a temperature between 100° and 500° C. to remove a major proportion of water and HCl. In the second stage the first stage product (a basic aluminium chloride) is heated at a temperature between 600° and 900° C. to produce anhydrous aluminium chloride which is removed by a carrier gas, which preferably contains gaseous HCl, and leave a residue of $\alpha$-$Al_2O_3$. Only some 10-20% of the aluminium present in the starting material emerges as the anhydrous chloride product.

SUMMARY OF THE INVENTION

The present invention seeks to overcome the disadvantages of the prior art processes and produce high purity anhydrous aluminium chloride which can be used as feed in the electrolytic production of aluminium metal.

More specifically, the primary objective of the present invention is to provide a process whereby high purity anhydrous aluminium chloride is produced from aluminium chloride hexahydrate by dehydration followed by chlorination at low temperatures.

The invention also aims to avoid the necessity for high purity of the reductant, carbon monoxide, and to use as the chlorinating medium a gas mixture containing carbon monoxide, carbon dioxide and hydrogen, which is more economical to produce than pure carbon monoxide, without any detriment to the process of production of anhydrous aluminium chloride.

Basically, the process of the present invention relies upon the removal of most of the water from hexahydrate at temperatures which are compatable with reasonable rates of water removal and at the same time making sure that the product of dehydration is reactive to chlorine-containing gases at low temperatures, i.e. below 600° C.

Thus, according to the present invention, a process for obtaining anhydrous aluminium chloride from aluminium chloride hexahydrate comprises heating the hexahydrate at a temperature in the range 200°–450° C. until it is substantially dehydrated and reacting the dehydrated material at a temperature in the range 350°–600° C. with a gas mixture containing chlorine, carbon monoxide, carbon dioxide and hydrogen, to produce gaseous anhydrous aluminium chloride.

BRIEF DESCRIPTION OF THE DRAWING

The FIGURE shows the relationship between chlorine utilization versus temperature as described in Example 3 hereinafter.

DETAILED DESCRIPTION OF THE INVENTION

Preferably, the dehydration and chlorination steps are both carried out in a fluidized bed reactor. Hence, in accordance with a preferred embodiment of the invention, a process for obtaining anhydrous aluminium chloride from aluminium chloride hexahydrate comprises heating the crystalline hexahydrate in a fluidized bed reactor maintained at a temperature in the range 200°–450° C. to substantially dehydrate the crystals, reacting the dehydrated material, in the same or another fluidized bed reactor, which is maintained at a temperature in the range 350°–600° C., with a gas mixture containing chlorine, carbon monoxide, carbon dioxide and hydrogen, condensing anhydrous aluminium chloride from the gases leaving the fluidized-bed reactor.

Preferred gas mixtures for use in the invention contain, by volume, 30 to 50% chlorine 30 to 50% carbon monoxide, 5 to 15% hydrogen and 5 to 15% carbon dioxide. Preferred temperature ranges for the dehydration and chlorination stages are, respectively, 300°–400° C. and 400°–500° C.

Having outlined the invention in broad terms, further details will be provided by way of specific examples which are provided herein for purposes of illustration only and are not intended to be limiting on the invention.

Reference will be made to the accompanying drawing which is a graph showing chlorine utilisation versus temperature for the chlorination step.

EXAMPLE 1

10 g of aluminium chloride hexahydrate crystals were dehydrated at 100° C. for 24 hours. The loss of weight of water corresponded to 3.6% only.

EXAMPLE 2

415 g of aluminium chloride hexahydrate crystals were dehydrated at 400° C. in an externally heated fluidized-bed reactor (7.5 cm diameter) for 2 hours. Nitrogen was used as fluidizing gas. The water removed corresponded to 98%.

EXAMPLE 3

20 g of samples of the dehydrated material produced in Example 2 were reacted for 72 minutes with a gas mixture consisting of $CO+Cl_2$ in the ratio of 1:1 (v/v) in a fluidized-bed reactor (2.5 cm diameter) at temperatures of 250°, 300°, 400°, 450°, 500° and 600° C. The gas flow rate was 200 $cm^3/min$. The gaseous products from the reactor containing anhydrous aluminium chloride were absorbed in a sodium chloride column heated to 150° C. and sodium chloroaluminate collected in a flask was analysed for aluminium values. Chlorine utilization (calculated from the amount of aluminium in the double salt) at the various temperature is shown in the Figure. The results show that chlorine utilization of greater than 85% is obtained at temperatures above 400° C. and 450° C., chlorine utilization is 97%.

EXAMPLE 4

A 20 g sample of the dehydrated material from example 2 was reacted with a gas mixture containing, by volume, 43% $Cl_2$, 47% CO and 10% $CO_2$ at 400° C. using the procedure of Example 3, but using a flow rate of 230 $cm^3/min$. The chlorine utilization was 88.1%.

EXAMPLE 5

A 20 g sample of the dehydrated material from example 2 was reacted with a gas mixture containing, by volume, 39% $Cl_2$, 47% CO, 9% $CO_2$ and 5% $H_2$ at 400° C. using the procedure of Example 3, but at a flow rate of 305 $cm^3/min$. The chlorine utilization, including reaction with hydrogen, was 87.1%.

EXAMPLE 6

A 20 g sample of the dehydrated material from Example 2 was reacted with a gas mixture containing, by volume, 41% $Cl_2$, 39% CO, 8% $CO_2$ and 12% $H_2$ at 400° C. using the procedure of Example 3, but at a flow rate of 360 $cm^3/min$. The chlorine utilization was, including reaction with hydrogen, 88.3%.

EXAMPLE 7

The experiment of Example 6 was repeated at a temperature of 500° C. The chlorine utilization was 94.6%.

Example 1 clearly shows that dehydration of $AlCl_3.6H_2O$ at 100° C. leaves more than 95% of water in the product and subsequent reaction of this material with CO and $Cl_2$, as proposed in the prior art, would result in loss of both the $Cl_2$ and CO values.

On the other hand Examples 2 to 7 show that dehydration according to the present invention results in a product containing very little water which in turn results in negligible chlorine loss during the chlorination stage. It is also shown that chlorination using a mixture of gases containing $Cl_2$, $CO$, $CO_2$ and $H_2$ does not affect the efficiency of chlorination and accordingly the present invention allows the production of anhydrous aluminium chloride economically. As such it is a very significant improvement over the prior art processes.

What is claimed is:

1. A process for obtaining anhydrous aluminium chloride from aluminium chloride hexahydrate comprising heating the hexahydrate at a temperature in the range 200°–450° C. until the hexahydrate is substantially dehydrated and reacting the dehydrated material at a temperature in the range 350°–500° C. with a gas mixture containing chlorine, carbon monoxide, carbon dioxide and hydrogen, to produce gaseous anhydrous aluminium chloride.

2. A process as claimed in claim 1, wherein one or both of the dehydration and chlorination steps are carried out in a fluidized bed reactor.

3. A process as claimed in claim 1, wherein the temperature for the dehydration step is in the range 300°–400° C.

4. A process as claimed in claim 1, wherein the temperature for the chlorination step is in the range 400°–500° C.

5. A process for obtaining anhydrous aluminium chloride from aluminium chloride hexahydrate comprising heating the hexahydrate at a temperature in the range 200°–450° C. until the hexahydrate is substantially dehydrated and reacting the dehydrated material at a temperature in the range 350°–600° C. with a gas mixture containing, in volume %, 40 to 50% chlorine, 30 to 50% carbon monoxide, 5 to 15% carbon dioxide, and 5 to 15% hydrogen, to produce gaseous anhydrous aluminium chloride.

* * * * *